H. H. WIXON.
EXPLOSIVE ENGINE.
APPLICATION FILED MAY 14, 1910.

1,175,395.

Patented Mar. 14, 1916.
4 SHEETS—SHEET 1.

WITNESSES:

INVENTOR
Howard H. Wixon
BY
A. Willis Belfield
ATTORNEY

UNITED STATES PATENT OFFICE.

HOWARD H. WIXON, OF CHICAGO, ILLINOIS.

EXPLOSIVE-ENGINE.

1,175,395.  Specification of Letters Patent.  Patented Mar. 14, 1916.

Application filed May 14, 1910. Serial No. 561,350.

*To all whom it may concern:*

Be it known that I, HOWARD H. WIXON, a citizen of the United States, residing at Chicago, in the county of Cook and State of Illinois, have invented a certain new and useful Improvement in Explosive-Engines, of which the following is a full, clear, concise, and exact description, reference being had to the accompanying drawings, forming a part of this specification.

My invention relates to internal combustion engines, most of the novelty thereof relating particularly to such engines in which the combustible is burned explosively on what is commonly called the two stroke cycle.

The object of my present invention is chiefly to improve the construction and operation of two stroke cycle engines of my invention as shown in my earlier application, Serial No. 343,277, filed Nov. 13, 1906, and my earlier Patent No. 947,566 granted Jan. 25th, 1910, though my present invention is not limited to detail improvement of my earlier inventions.

The general object of my present invention is the same as in my earlier inventions, the main object being to provide a compact and highly efficient two cylinder engine.

The invention consists in the features of construction, operation, combination and arrangement of parts described in this specification, illustrated in the accompanying drawings, and particularly pointed out or specified in the appended claims. This engine, like my earlier ones, is especially adapted for use in automobiles and like service, though it is not limited to such use or application and can be widely modified in many ways for other use without departure from the invention as hereinafter claimed.

In the accompanying drawings: Figs. 12 are a (enlarged) side and end view of one of the air valve cams; Figs. 13 are a (enlarged) side and end view of one of the inlet valve cams; Fig. 14 is a section of the inlet valve casing, etc. along the line $g$—$h$ of Fig. 8; Fig. 15 is an enlarged view of the governor and part of the attached camshaft etc.; Figs. 16, $^a$ to $^c$ inclusive, are cross sections at different points of Fig. 15; Fig. 16$^d$ is a cross section on the line D—D of Fig. 15; Fig. 16$^e$ is a cross section on the line E—E of Fig. 15; Fig. 17 is a longitudinal section along the line $j$—$j$ of Fig. 15; and Fig. 18 is a diagram to illustrate the operation of my engine.

The same reference characters indicate similar parts in the different figures.

My present engine preferably uses all three elements of pump supply of the explosive charge to the explosion chamber or cylinder, an air charge in addition to and ahead of the explosive charge, and return or rejection of part of the explosive charge from the explosion chamber; all three of the above elements being used for the same general purpose or purposes as in my earlier engines.

The following is a description of my engine as I prefer to construct it with two cylinders 1 and 2 and the water jacket 3, all in one piece, no attempt being made to show details of manufacturing construction not necessary for an understanding of the invention. Each cylinder is bored out with a small bore 4 and 5 which forms an explosion chamber and a large bore 6 and 7 which forms a pump. Each cylinder is provided with a two diameter or double area piston 8 and 9. Each piston has the upper end or small part provided with rings 10 and fitting the bore of the explosion chamber, while the lower end is enlarged and fits the bore of the pump chamber being also provided with rings 11. The large area end of each piston acts as a piston in each pump chamber 6 and 7, while the smaller end of each piston acts as a piston in each explosion chamber 4 and 5. These pistons 8 and 9 are connected to the crank shaft 12 by the connecting rods 13, the cranks of the connecting rod being set one-half revolution or 180 degrees from each other, and the crankshaft is preferably provided with a fly-wheel or balance wheel 14. Fastened on this crankshaft is the gear 15 which drives the camshaft 16 through gears 17 and 18 and also drives the camshaft 19 through gears 20 and 21.

22 is the explosive mixture inlet. Any suitable device or way of furnishing the explosive mixture (or charge of gas and air) may be used, but as the engine illustrated in the drawings is intended as an example of an automobile engine, and these engines are usually used with carbureters and usually use gasolene as a fuel, for the purpose of particular illustration my engine may be assumed, as herein referred to, to be provided with a gasolene carbureter, preferably of the type known as an automatic carbureter, the carbureter being attached to and furnishing the explosive mixture to the engine through the inlet 22 which serves as a common inlet pipe for both cylinders.

The inlet 22 connects with passage 23 through which the mixture is supplied (or admitted) through passage 24 or 25 to the pump chambers 6 or 7 (respectively) under the control of the inlet valves 26 and 27. These inlet valves are operated (preferably as shown) by the inlet cams 28 and 29 which are fastened on the camshaft 16 and rotate in unison with the engine crankshaft. The inlet valves are normally held closed by the springs 30 and 31. The stems of these valves may be provided with rollers 32 to minimize the wear on the engaging or wearing surfaces. On the camshaft 18 are also fastened the air valve cams 33 and 34 which operate the air valves 35 and 36, air valve 36 being normally held closed by spring 39 on the rod 38 which connects with lever 37, which connects with the stem of said valve 36, while air valve 35 is similarly, normally held closed by the spring 42 on the rod 41 connected to the lever 40 attached to said valve 35, the ends of the rods 38 and 41 also having rollers 43 to minimize wear or friction.

In the top of each cylinder or explosion chamber is placed the transfer valve 44 or 45, the stems of which pass through the stems of the air valves 36 and 35, this arrangement being herein termed concentric. The valve 44 is normally held closed by the spring 46 on the rod 47 connected to lever 48 attached to the stem of said valve 44, while valve 45 is normally held closed by spring 49 on the rod 50 connected to lever 51 attached to the stem of said valve 45. Rollers 58 and 59 are provided to reduce friction on the operating cams, the roller 58 being wide enough to extend over the two cams 60 and 55 (compound cam), while the roller 59 is wide enough to extend over the two cams 56 and 57, said cams being carried and rotated by the camshaft 19. The operation of these compound cams and camshaft is hereinafter more fully described.

The auxiliary air closing valve 61 is provided to close the passage 62 (air inlet) under certain conditions which will hereinafter be more fully described. This valve 61 is fastened on the rod 63 having the lever 64 attached, a partial rotation of rod 63 with the valve operating to close the passage or air inlet 62. Lever 64 connects with rod 65 connecting with lever 67 (pivoted on pin 68) connecting with rod 69 which passes freely through a hole in the controlling lever 71, the end of rod 69 being provided with a screw thread and nut 70 which may be adjusted on rod 69.

When the controlling lever 71 is moved (as hereinafter described) over to, or farther than, the position indicated by the dash line 72, it will engage the adjustable nut 70 which thereby operates through rod 69 and connected parts to close the air valve 61 in the passage 62, the air valve 61 being normally held open by the spring 66 on the rod 65. Thus the adjusting nut 70 determines when the air valve 61 shall close in relation to the movement of the controlling lever 71.

Figures 1, 3:
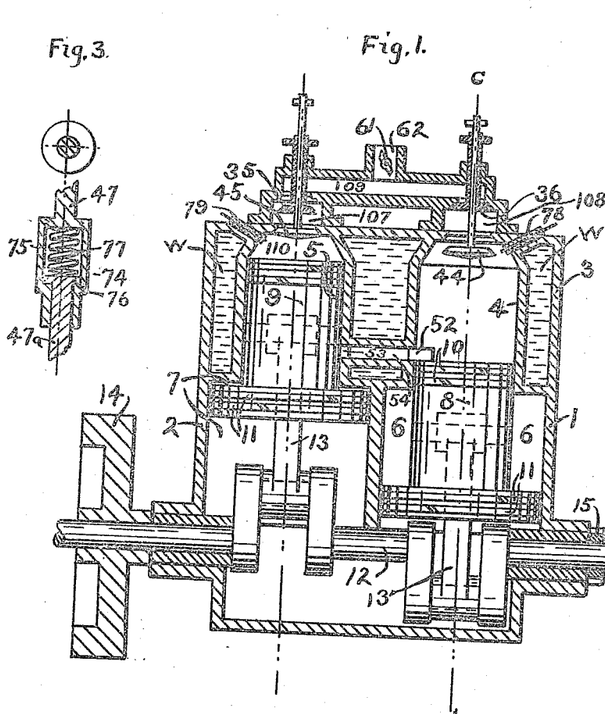
Figure 1 is a central longitudinal section of my engine along the line $a$—$b$ of Fig. 2 or 6 showing the mechanism and parts on this section.
Fig. 3 is a cross section of the safety device used to protect the transfer valve and its operating mechanism.
Figure 2:
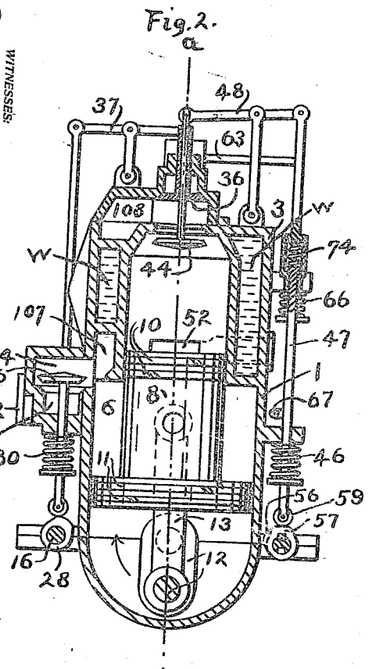
Fig. 2 is a cross section of my engine along the line $c$—$d$ of Fig. 1 or 5 showing the mechanism and parts on this section.

The exhaust ports 52 and 53 are placed near the lower end of each explosion chamber where they will be opened by their respective pistons, when said pistons are at or near the bottom of their stroke, said exhaust ports (which may be extended more around the cylinder, if desired) preferably uniting in one common exhaust passage 54. In (or forming part of) each rod 47 or 50 is the safety device 74 which is used to prevent breakage or undue strain on either of the transfer valves 44 or 45 or connected parts or operating mechanism therefor. Fig. 3 is an enlarged section of this safety device 74 in which the upper end of the rod 47 is screwed into the cylindrical case 75 through which the lower end of the rod 47 passes (being designated as 47ᵃ in Fig. 3) this part of the rod being provided with the shoulder 76. A rather strong spring 77 is inserted between the ends of the rods or parts designated as 47 and 47ᵃ, and it will be seen that when a normal force is exerted on part 47ᵃ (a force below the tension of the spring) it will be directly transmitted through the spring to part 47 as though the whole safety device were a solid part. Now, if from some cause, part 47 should be held against the forced movement of part 47ᵃ, it will be seen that spring 77 will yield and prevent breakage.

In the normal operation of my engine, the rod 47 having the safety device 74 inserted therein, acts practically as a solid rod, and the safety device 74 has no effect whatever, except at high engine speeds when it acts to slightly cushion the sudden blow from the cams when the valve is opened. If however from some cause there should be a high pressure in the explosion chamber, as for instance when the explosive mixture is ignited at the wrong time causing the engine to turn or kick backward, the valve 44 if closed will be held to its seat with a strong force and if the valve operating cams come into operation to open this valve at this time, an undue strain or force will be exerted on all the parts rendering them liable to breakage if not made unsually strong, and it is at this time that spring 77 will yield and prevent this strain or damage so that all these parts can be made a great deal lighter without danger of breakage.

At 78 and 79 are indicated spark plugs, the sparking points of which are inside of their respective explosion chambers and to which a suitable ignition current is furnished in the well known manner.

Figures 12, 13, 14, 15, 16A, 16B, 16C, 16D, 16E, 17, 18:
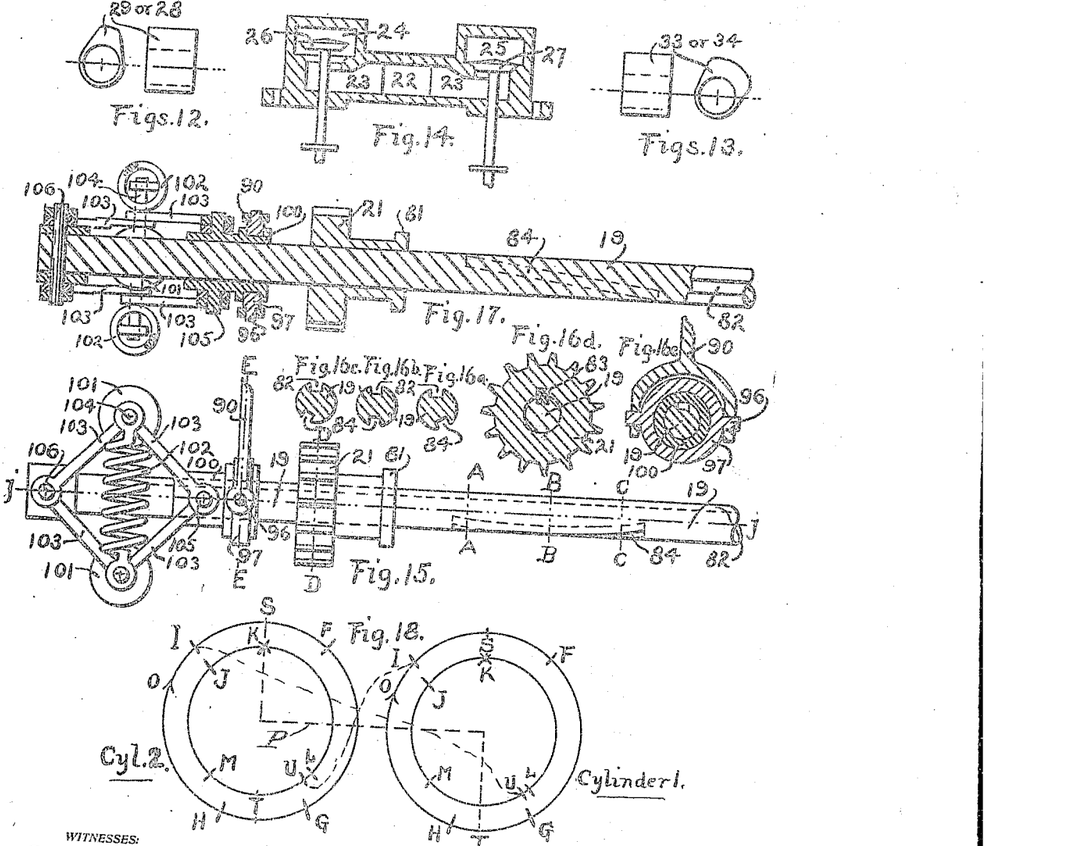

Now referring to the mechanism for governing or controlling the engine, the gear wheel 21 is held in its bearing 80 by the collar 81 (on the gear wheel). The camshaft 19 is free to move longitudinally through the gear wheel 21 and is provided with a straight keyway or slot 82 which extends nearly throughout its entire length, the gear wheel 21 having the key 83 fastened therein and engaging the slot 82, thus rotating the shaft 19 in unison with the engine regardless of what longitudinal position the shaft 19 may be in. The camshaft 19 is also provided with two similar slots or keyways, one keyway under, or in a suitable position to engage with a key and thereby operate one of the cams in the pair of cams 60—55, and the other keyway under, or in a suitable position to engage with a key and thereby operate one of the cams in the pair of cams 56—57; but these two keyways are comparatively short and extend across the shaft 19 in a slanting or diagonal position. One of these diagonal keyways is particularly illustrated in Figs. 10 and 15 to 17. This keyway 84 (dotted in Fig. 17) preferably is on the opposite side of the shaft 19 from the straight keyway 82. Fig. 16ᵃ is a section along A—A of Fig. 15, while Fig. 16ᵇ is a section along B—B, and Fig. 16ᶜ is a section along C—C, these sectional figures showing the relative positions of these different points of the diagonal keyway 84 to the same point on the straight keyway 82.

Figure 9:
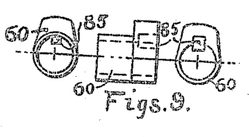
Figs. 9 are (enlarged) side and end views of one of the transfer valve opening cams.

One of the transfer valve cams 60 is shown enlarged in Figs. 9, and is provided with the key 85 which is fastened therein. This cam 60 is free (as are also cams 55—56—57) on the camshaft 19, but is rotated thereby by the key 85 which engages in the straight keyway 82 so that this cam, which is the cam that opens the transfer valve 44, is rotated in unison with and in some position related to the engine parts regardless of the longitudinal position of the camshaft 19. The other cam 55 for the transfer valve 44 is the closing cam, that is, it determines the point at which the transfer valve closes and this point is variable. In the enlarged figures of this transfer valve closing cam in Figs. 11, the key 86 is fastened therein and this key 86 engages in the diagonal or spiral slot 84 in the camshaft 19 so that a relative longitudinal movement of this camshaft will cause the cam 55 to partly rotate on the camshaft so that this movement of the camshaft will cause a relative movement of cam 55 in relation to the engine parts and in relation to cam 60, and this relative movement of the cams is particularly illustrated in the three end views or figures designated as Figs. 10.

Figure 10:
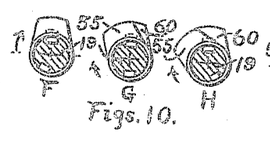
Figs. 10 illustrate the relative positions of a pair of opening and closing transfer valve cams under different positions of engine load.
Figure 11:
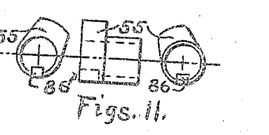
Figs. 11 are (enlarged) side and end views of one of the transfer valve closing cams.

In Fig. 10 at F is shown the relative position (which corresponds to full engine load position) of a pair of cams (60 and 55) when the camshaft is in a longitudinal position where the section A—A thereof will carry or drive these cams, and it will be seen that at this time both cams are together and the length of the arc of the raised cam surface is the smallest thereby holding the valve 44 open for the shortest time. Now, if the camshaft 19 be moved longitudinally so that the slots 82 and 84 at the section B—B engage the keys 85 and 86 in their cams, the effect will be to retard the cam 55 in relation to cam 60 so that the total raised cam surface is larger, the cam 60 serving to open valve 44 which is then held open until roller 58 passes off of the raised surface of cam 55, cam 55 serving to determine the point at which the transfer valve 44 closes. If the camshaft be further moved to the point corresponding to the lowest speed of the engine, or in other words, moved longitudinally so that the slots 82 and 84 at the section C—C engage the keys 85 and 86 in their cams, the effect will be to still further retard the cam 55 in relation to cam 60 so that the total raised cam surface will be further increased, cam 60 serving to open the transfer valve at the same time as the previous instances, but cam 55 allowing the transfer valve to close at a much later period, it being understood that the time of closing of transfer valve 44 may be gradually varied from that corresponding to the position of the cams in Fig. 10 at F to that position indicated in Fig. 10 at H, said variation depending on the position of camshaft 19.

The cams 60—55 and 56—57 float on the camshaft 19 but are held from longitudinal movement by the collars 88 or bearings 89 for the camshaft 19, it being understood that the operation of the pair of cams 56—57 is the same as the operation of the pair of cams 60—55, except that they are spaced for operation one half revolution behind the others. Any means of causing a relative shifting or timing of the opening and closing cams relative to each other comes within the terms of my invention regardless of whether these cams are rotated in the same or opposite directions or whether they are given a reciprocating or rocking movement.

The control of my engine as illustrated depends on the longitudinal position of the camshaft 19, and this may be either automatically or manually regulated as desired, but I prefer a combination of automatic and manual control.

The control lever 90 is pivoted at 91 to the link 92 which also carries the quadrant 93 and is pivoted at 94 to the bracket 95, the other end of this control lever 90 being pivoted at 96 to the ring 97. Any kind of a well known device may be used for holding the lever 90 in any position in which it may be set, such a device being indicated at 98 and consisting of a spring and pin in the lever 90, the pin being pressed into small recesses 99 in the quadrant 93. The ring 100 fits loosely on the shaft 19 and runs within the ring 97 for which it has suitable shoulders to hold ring 97 in place. It will be seen that if ring 100 were attached directly to the shaft 19, any movement of the control handle 90 would directly cause a longitudinal movement of camshaft 19 and thus control the engine as hereinafter described, and in some cases this is desirable. I prefer, however, to insert an automatic governor in between the ring 100 and the camshaft 19 as illustrated so that the governor will nearly maintain automatically any engine speed for which it may be set within the range of its control, while at the same time any movement of the control handle 90 will change the adjustment of the governor and thereby the engine may be manually controlled practically the same as if there were no governor attached and in such case the governor also acts as an automatic safety device to prevent the engine running at excessive speed in case the engine load should suddenly be released. The governor of the flyball type however, as I have applied it will be practically out of action at the lowest engine speeds and also at the highest engine speeds, due to the fact that at the lowest speeds there is not enough centrifugal force to operate the governor balls while at the highest speeds there is sufficient centrifugal force to cause the governor balls to remain in their outermost extended position all the time, it being understood that in such case, the control lever has been moved to its extreme positions as indicated by the dash lines 72 or 73, as the governor will be practically operative over a wide range of intermediate speeds as before described. This governor is of the ordinary flyball centrifugal type having one part connected to the camshaft 19 while the other part is connected to the ring 100 which has its position determined by the control lever 90. As illustrated, the governor consists of two flyballs 101 which are pulled together by the springs 102, the links 103 being pivoted at 104 to the flyballs and pivoted at 105 to the ring 100 and pivoted to camshaft 19 by pin 106 which fastens the whole governor mechanism to camshaft 19 so that it rotates therewith. In Fig. 15, (and Fig. 4), the governor is shown in a normal running position where the governor is supposed to have automatic control of the engine and the governor balls are in about their middle position. If the engine load should change so that the speed is increased the balls would fly outward against the pull of the springs or be further extended from this position and this would cause the camshaft 19 to be moved to the right which shifts cam 55 and cam 57 so as to hold their respective transfer valves open for a longer period and thus allows less explosive charge to be retained in the explosion chambers as hereinafter described, so that the engine speed is kept from rising.

If the engine load should change so that the speed is decreased the opposite action will occur and the governor balls will be drawn in by the springs from the position illustrated and this would cause the camshaft 19 to be moved to the left which shifts cam 55 and cam 57 so as to hold their respective transfer valves open for a less period and thus allows more of the explosive charge to be retained in the explosion chambers as hereinafter described, so that the engine speed is held up to normal. If now it is desired to either lower or raise the engine speed, the control lever 90 is correspondingly moved, which results in moving both the governor and attached camshaft 19, the result of movement of the control lever 90 being the same (for most practical purposes) as if there were no governor intermediate between this camshaft and control lever; though as said before, the governor will still operate (within its range) to automatically maintain a nearly constant engine speed corresponding to the point at which the control lever 90 may be set or adjusted. Collars or any suitable stops may be provided to limit the longitudinal movement of camshaft 19, if desired.

Figures 4, 5:
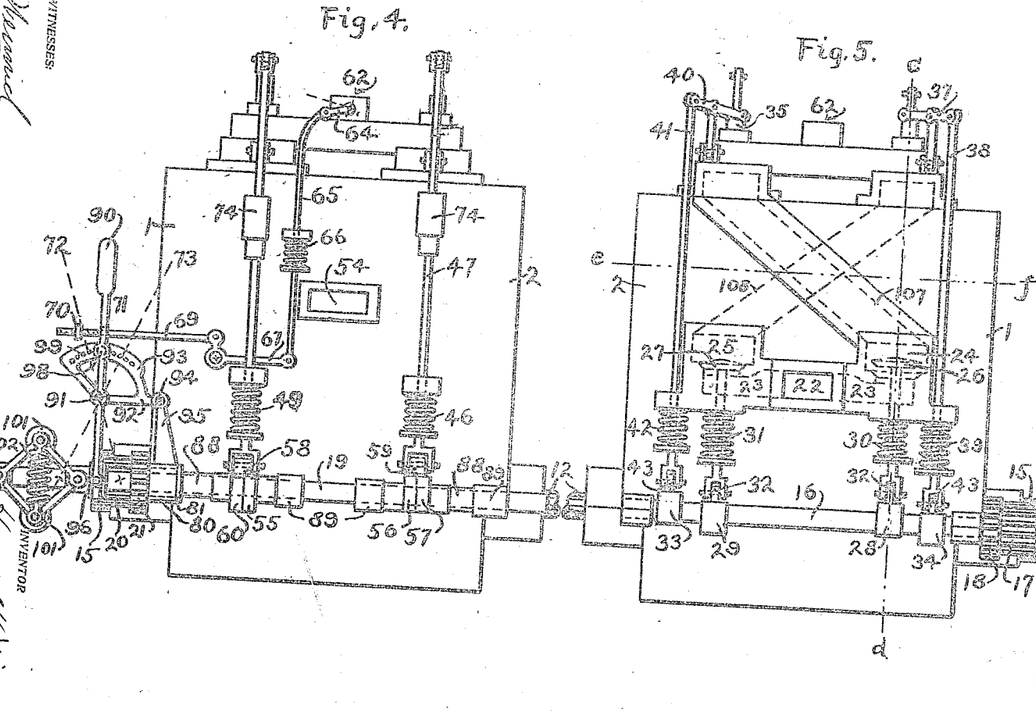
Fig. 4 is a side view of my engine showing the mechanism and parts on the exhaust side of the engine.
Fig. 5 is a view of the other, or inlet side of my engine, showing the mechanism and parts on this side.
Figure 6:
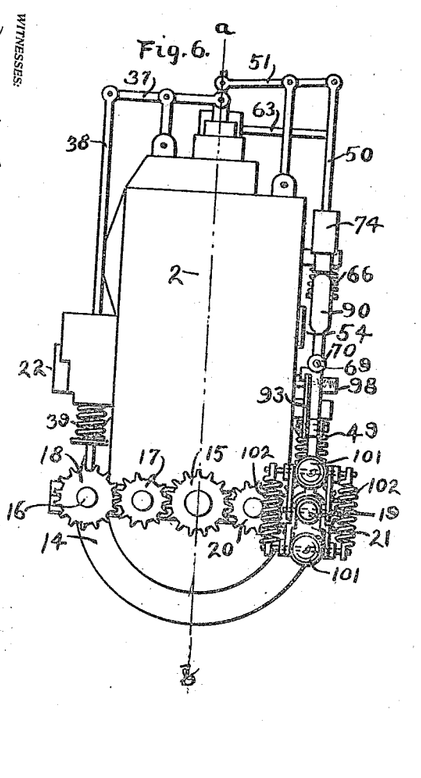
Fig. 6 is an end view showing the governor end of my engine.
Figure 7:
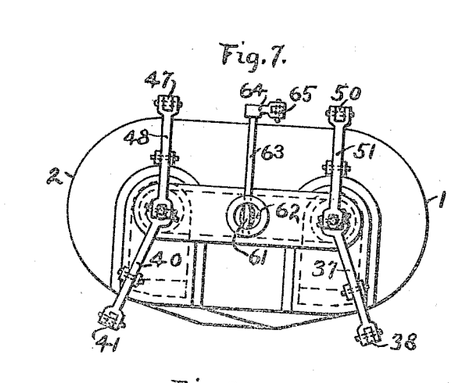
Fig. 7 is a view showing the top of my engine.
Figure 8:
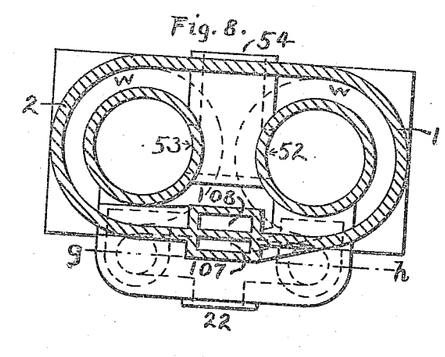
Fig. 8 is a cross section of the cylinders along the line $e$—$f$ of Fig. 5.

In Fig. 4, the dash line 72 indicates the position of the control lever 90 at its lowest engine speed or starting position, at which point lever 90 will strike nut 70 and thereby hold air valve 61 closed for the purpose hereinafter described; while the dash line 73 indicates the position of the control lever 90 at the maximum or highest engine speed or power.

In the operation of my engine the large diameter of each piston acts to pump the charge of explosive mixture into the explosion chamber of the cylinder in which the other piston acts. Thus the mixture in pump chamber 6 of cylinder 1 is transferred through passage 107 to explosion chamber 5 of cylinder 2, while the mixture in pump chamber 7 of cylinder 2 is transferred through passage 108 to explosion chamber 4 of the cylinder 1.

My engine operates on the two stroke cycle, or in other words, a cycle of operations is completed each time a piston makes two strokes while the crankshaft makes one revolution; the cycle of operations of each cylinder being spaced 180 degrees or one half of a crankshaft revolution behind the cycle of operations in the other cylinder, it being understood that all the parts for one cylinder, as illustrated, are substantially the same in construction and operation as the parts for the other cylinder except that the parts for one cylinder are arranged for operation one half revolution behind the parts of the other cylinder. This arrangement gives one explosion stroke every half revolution or two explosions per revolution of the flywheel (or crankshaft).

The operation of my engine is as follows, particular reference being had to the diagram in Fig. 18 in connection with the other drawings: In the diagram the large circles represent the operations in the pump chambers while the smaller inner circles represent the operations in the explosion chambers, the two circles for each cylinder being concentrically arranged and having the dash line P to indicate the engine camshaft (which has its direction of rotation indicated by the arrows) relative capacity of mixture air and pump chambers, etc. It is assumed that suitable well known accessories are provided for the operation of the engine, such as a suitable source of ignition current led to the spark plugs 78 and 79, water circulation W to keep the cylinders cool, oiling system for lubrication, and means to supply a suitable explosive mixture to the inlet 22 which is preferably by a carbureter, etc. On the down stroke (S to T) of the double area piston in cylinder 1 the explosive mixture is drawn into the pump chamber 6 through inlet 22 and passages 23 and 24, the inlet valve 26 being opened by its cam about at point F in the diagram and held open to point H, and when about point G is reached the air valve 35 is opened by its cam and also held open to point H so that air is drawn in by the suction in pump chamber 6 through passages 62, and 109 into the transfer passage 107 probably a small amount of this air being also drawn into the pump chamber 6, but most of it remaining locally in the passage 107. At point H where the said air and inlet valve close, the pump chamber will be filled with an explosive gas mixture while the transfer passage will be filled with a charge of pure air, and it should be noted that, while the said air valve is open, the pump chamber is opened directly to the atmosphere so that the pump chamber is so much more completely filled than would be the case if all the mixture were drawn through the inlet 22. This is an important feature of my invention especially in connection with the relative size or capacities of the pump and explosion chambers. It should also be noted that both the inlet and air valves tend to open automatically when there is a suction in the pump chamber, but it is preferable to use springs sufficiently stiff in combination with the cam operation of the valves, which allows the relative quantities of the air charge and the explosive mixture charge to be determined with precision and also has the further great advantage of almost entirely avoiding the resistance of the valves to the passage of fluid.

The relative quantity of air and explosive mixture may be varied if desired by changing the relative shape of the air and inlet valve cams, and it will be seen that (as illustrated) most of the explosive mixture is supplied or drawn in before the air valve is opened to admit air. On the up stroke of the piston in cylinder 1, the charge in the pump chamber 6 and connected passages 24 and 107 (which may be termed compression space) is compressed to a comparatively low pressure (low pressure compared to the compression in the explosion chamber) up to point I, part of the mixture being compressed into said connected passages and the local air charge being compressed into the upper end of passage 107. At point L in cylinder 2 the piston is near the lower end of its stroke, thereby opening the exhaust port 53, and almost immediately the transfer valve 45 is opened at point U and the compressed charge from the pump chamber 6 is admitted or transferred to the explosion chamber 5, the pure air being admitted first and followed by the explosive mixture, while the exhaust occurs; that is, all the products of combustion are pushed out of the exhaust port 53 at the lower end of the explosion chamber, while the fresh charge enters at the top end of the explosion chamber, a layer of air being interposed in between the outgoing (often still burning) exhaust gases and the incoming explosive charge, which prevents improper ignition of this explosive charge. From point L to M in cylinder 2 the exhaust continues from the explosion chamber which is completely filled with a fresh charge about the time point M is reached. On the up stroke of the piston in cylinder 2, if the conditions are such that there is a full load on the engine, the transfer valve 45 will close at point M and the exhaust port will also be closed at this point, so that the full charge will be retained in the explosion chamber 5 and compressed up to point S where the charge reaches its maximum compression in the compression space 110. Under the above condition of full load, or in other words, under a condition of engine operation where it is desired to retain a full explosive charge in the engine cylinder and thereby obtain the greatest force from the explosion and expansion of the mixture, the transfer valve cams of each pair of cams will be in the position relative to each other as illustrated in Fig. 10 at F where it will be seen that the cam previously described as the transfer valve closing cam is practically out of action and the cam previously described as the transfer valve opening cam operates to open the transfer valve at point L allowing it to close at point M as described, the relative position of these cams being determined either manually or automatically as previously described. At or about point S, the explosive mixture is ignited in chamber 5 driving the piston in cylinder 2 down and furnishing power until the exhaust occurs at point L as before, thus completing the cycle of operations. If the running conditions are such that there is only part of the full load on the engine or when the engine is to be run at reduced speed, then the transfer valve operating mechanism is correspondingly shifted either manually or automatically so that the transfer valve closing cam is retarded relatively to the transfer valve opening cam as illustrated in Figs. 10 at G and H, the transfer valve thereby opening as before at point U (in the cycle) but being held open during a more or less part of the up stroke of the engine piston, the transfer valve closing at a point between M and J depending on the extent to which the cam (which allows this valve to close) has been shifted by its operating mechanism relatively to the cam which opens the transfer valve. After the exhaust port closes and while the transfer valve is open on the up stroke of the piston, part of the charge which was transferred to the explosion chamber is returned or rejected or pumped back into the pump chamber from which it came as the piston therein is on its suction stroke and this rejected part of the charge is composed of the pure mixture from the upper part of the explosion chamber as the auxiliary or intermediate air charge (what does not go out in the exhaust) will be largely in the bottom of the explosion chamber (where it tends to keep the piston cool.) By exhausting or displacing all the burnt gases from the explosion chamber and returning or rejecting as much of the fresh charge as is not desired to explode (which is determined by the governor or the position of the control handle), it will be seen that the fresh charge will not be diluted (rendered inefficient) with the products of combustion, the charge remaining in the cylinder will be comparatively cool, and the proportions or strength of the charge remaining is kept nearly constant as the quantity of the charge is proportioned to the load. By using just the quantity of pure constantly proportioned charge as is required in proportion to the engine load or speed, the highest engine efficiency is obtained while the engine also possesses the highest degree of control or regulation of the speed or power within wide limits, due to the fact that a properly proportioned mixture is readily ignited if kept constant, whereas a mixture (such as is usually used in automobiles) will not ignite except within narrow limits if the proportions of air and fuel are changed very much.

When my engine is so regulated that the transfer valve 45 is held open for a considerable part of the up stroke of the piston to allow rejection of part of charge to the pump chamber 6, it will happen that the inlet valve 26 to the pump chamber 6 is also open during a part of this time. I have perceived that these two valves can be opened at the same time without interference with the engine operation, and thereby enable the inlet valves of my engine to be opened during practically the whole suction stroke of the piston in the pump chamber, and also enable these valves to be mechanically operated with simple mechanism, which allows the pump chambers to be most completely filled (at full load) and contributes to a high maximum power for the engine. This does not interfere with the operation because the supply of fresh charge to the pump chamber 6 through the inlet 23 depends on the suction in the pump chamber when a carbureter is used, and during the return of part of the charge from the explosion chamber 5 to the pump chamber 6 there is little or no suction through the inlet 22 and at the same time the suction in the pump chamber 22 prevents that part of the charge which is being rejected from the explosion chamber 5 from going out the inlet 22 even though the inlet valve is open. The suction through the inlet 22 begins when the transfer valve 45 closes and continues until the end of the suction stroke of the piston in the pump chamber 6, so that, at the end of the suction stroke (point H) the pump chamber 6 is completely filled, the pump chamber 6 being completely filled at this time under all conditions of engine load or speed and enough new charge being drawn in through the inlet as has been used in the explosion chamber to make the previous explosion.

As the parts and operations in one cylinder are just the same as the parts and operations in the other cylinder, the cycle of operations as above described for the pump chamber 7 and the explosion chamber 4 is just the same as the cycle of operations for the pump chamber 6 and the explosion chamber 5, as is clearly indicated in the diagram Fig. 18 where the same letters refer to the same points in a cycle, there being two cycles or series of operations going on at the same time and the explosion stroke of one cycle taking place during the compression stroke in the other cycle.

In starting or cranking my engine to start and when running at a very low speed, it is desirable temporarily to shut off the supply of the auxiliary air charge. This is accomplished by shifting the control lever 90 to the corresponding or starting position indicated by the dash line 72, at which time the lever 90 will strike nut 70 and move rod 69 and connected parts, which results in closing the valve 61 and thereby shuts off the supply of the auxiliary air charge through passage 109. When the auxiliary air supply is shut off there is a greater suction through the inlet 22, which tends to more completely vaporize the fuel and thereby make starting of the engine easier. Of course my engine will operate at higher speeds without any auxiliary air charge, but the use of the air charge as described increases the engine efficiency and makes the maximum engine speed possible, as at the maximum speeds the burning exhaust gases in the explosion chambers will ignite the incoming fresh charge unless the fresh charge and exhaust gases are separated by a non-combustible medium such as air. When the air is shut off, all of the charge or mixture in the pump chambers and connected transfer passages is composed of the explosive mixture which was originally drawn in through the inlet. It will be noted that the air is shut off rather abruptly (when the control handle about reaches the starting position indicated by line 72) due to the proportions of the lever 67 and this shutting off of the air may be made more gradual if desired by correspondingly changing the relative lengths of the lever arms of lever 67.

An important feature of my invention is the relative capacity of the pump and explosion chambers, which is such that each explosion chamber is thoroughly scavenged of all products of combustion at each exhaust stroke and is also partly cooled internally. This relative capacity will vary somewhat in different sizes of engines having different sized compression spaces (110), but the capacity of the pump chambers is always preferably larger than the capacity of the explosion chambers. The size of the large end 11 of the pistons in my engine is preferably such that its displacement capacity in the pump chamber 6 (or 7) is about 25% greater than the combined capacity of the compression space 110 of the explosion chamber and the displacement capacity of the small end of the piston 9 in its explosion chamber 5; and this surplus is utilized to pump an extra quantity of pure cool air through the combustion or explosion chamber to perform a scavenging and cooling action during the exhaust part of the cycle. Thus, during the transfer or exhaust part of the cycle, the charge pumped into the explosion chamber is composed of about 25% to 35% of pure air and the remainder composed of the explosive charge, the air entering the explosion chamber first and the surplus of the total charge passes out of the exhaust ports, this surplus being the pure air which entered the explosion chamber in addition to and ahead of the explosive charge.

While I have herein shown and particularly described the preferred embodiment of my invention, I do not limit myself to the precise construction and arrangement as herein set forth, but

Having thus described my invention, what I claim as new and desire to secure by Letters Patent is:—

1. In a two cycle explosive engine, the combination of a pump chamber and an explosive chamber, an inlet to said pump chamber, a valve in said inlet, mechanical means to open said valve during substantially the whole or greater part of the suction stroke in said pump chamber regardless of the suction therein, whereby said inlet may be opened during the hereinafter rejection, means to transfer the charge from the pump chamber to the explosion chamber, and means to reject or return a part of the charge from the explosion chamber to the pump chamber prior to ignition.

2. In a two cycle explosive engine, the combination of a pump chamber and an explosion chamber, means to admit an explosive mixture to the pump chamber, means to open said pump chamber to the air supply after the main charge of explosive mixture has been admitted to the pump chamber, means to transfer the charge from the pump chamber to the explosion chamber, and means to return a part of the charge from the explosion chamber to the pump chamber prior to ignition.

3. In a two cycle explosive engine, the combination of a pump chamber and an explosion chamber, an explosive mixture inlet to the pump chamber, a separate air inlet to admit air to be drawn into the pump chamber in addition to and separate from the explosive mixture, means confining and controlling said air whereby said air will enter the explosion chamber in addition to and ahead of the explosive charge, and means to effect the return of a part of the charge from the explosion chamber to the pump chamber prior to ignition in the cycle for the purpose of regulation as described.

4. In a two cycle explosive engine, the combination of a pump chamber and an explosion chamber, a valve controlling the return of a part of the explosive mixture from the explosion chamber to the pump chamber prior to ignition, automatic means to vary the time said valve remains open, to thereby regulate the quantity of mixture returned as above, and manual means by which the action of said automatic means can be changed, substantially as described.

5. In a two cycle explosive engine, the combination of a pump chamber and an explosion chamber, an explosive mixture inlet to the pump chamber, a separate air inlet to said pump chamber, means to regulate the speed or power of said engine, and means to close said air inlet and render same inoperative during part of the said regulation.

6. In a two cycle explosive engine, the combination of a pump chamber and an explosion chamber, an explosive mixture inlet to the pump chamber, a separate air inlet to said pump chamber, means to transfer the charge from the pump chamber to the explosion chamber, means to effect the return of part of said charge from the explosion chamber to the pump chamber to regulate the speed or power of the engine, and means to close said air inlet and render same inoperative during part of the cycle of said engine.

7. In a two cycle engine, the combination of two cylinders parallel to each other, a two diameter piston in the two diameter bore of each of said cylinders, the small diameter part of each piston forming an explosion chamber with its cylinder, the large diameter part of each piston forming a pump chamber with its piston, inlet valves to said pump chambers, mechanism to open said inlet valves during practically the whole or most of the suction stroke in said pump chambers whereby said valves may be open during the hereinafter rejection, means to effect the transfer of the charge from the pump chamber of each cylinder to the explosion chamber of the other cylinder alternately, and means to effect the return or rejection of part of the charge from each explosion chamber to the pump chamber of the other cylinder prior to ignition, substantially as described.

8. A two cycle engine having a pump chamber and an explosion chamber with a piston therein, a valve for controlling the admission of fluid to said explosion chamber, a second valve concentric on the stem of said first valve, for controlling the admission of fluid to the pump chamber or passages forming part thereof, and a third valve or inlet controlling the admission of the main body of fluid to the pump chamber, substantially as described.

9. In a two cycle engine, the combination of a pump chamber and an explosion chamber with a piston therein, an inlet to the pump chamber, means to effect the transfer of the charge from the pump chamber to the explosion chamber, means to permit exhaust from the explosion chamber, a valve controlling the return of part of the charge from the explosion chamber to the pump chamber prior to ignition, an actuating cam to open said valve, a second cam controlling the closing of said valve, and means to shift said second cam relative to the first cam whereby the duration of opening of said valve may be varied substantially as described by the unit actuation of said cams.

10. In a two cycle explosive engine, the combination of an explosion chamber, an explosive mixture pump chamber having a displacement capacity substantially equal to or greater than the combined displacement capacity of the piston in the explosion chamber and the compression space of the explosion chamber above the piston, an explosive mixture inlet to said pump chamber, an air inlet to said pump chamber, a valve in said air inlet, mechanical means to time the opening of said air valve and thereby control admission of air to said pump chamber in addition to but after the admission of part of the explosive mixture, and means to transfer said air and explosive mixture to the explosion chamber.

11. In a two cycle engine, the combination of two cylinders, a two diameter piston in the two diameter bore of each of said cylinders and forming therewith a pump chamber and an explosion chamber for each cylinder substantially as described, means to admit explosive gas to said pump chambers, means to admit air to said pump chambers in addition to but after the main charge of explosive gas has been admitted to each of the pump chambers substantially as described, and means to transfer the charge from the pump chamber of each cylinder to the explosion chamber of the other cylinder alternately, all substantially as described.

12. In a two cycle engine, the combination of two cylinders, a two diameter piston in the two diameter bore of each of said cylinders and forming therewith a pump chamber and an explosion chamber for each cylinder, substantially as described, means to admit a substantially constant quality of mixture to the pump chambers under varying conditions of engine operation, means to transfer the mixture from the pump chamber of each cylinder to the explosion chamber of the other cylinder alternately as described, and means to return a portion of the mixture from the explosion chambers to the pump chambers prior to ignition for the purpose of regulation as described.

13. In a two cycle engine, the combination of two cylinders, a two diameter piston in the two diameter bore of each of said cylinders and forming therewith a pump chamber, and an explosion chamber for each cylinder substantially as described, means to admit explosive gas to said pump chambers, means to admit air to said pump chambers in addition to but after the main charge of explosive gas has been admitted to the pump chambers substantially as described, means to transfer the charge from the pump chamber of each cylinder to the explosion chamber of the other cylinder alternately, and means to return a portion of the charge from each explosion chamber to its connected pump chamber, all substantially as described.

In witness whereof, I hereunto subscribe my name this fourth day of May A. D. 1910.

HOWARD H. WIXON.

Witnesses:
  Max W. Zabel,
  Hazel Jones.